Patented June 24, 1947

2,422,670

UNITED STATES PATENT OFFICE 2,422,670

SELECTIVE DEMETHYLATION OF PARAFFINIC HYDROCARBONS

Vladimir Haensel and Vladimir N. Ipatieff, Riverside, Ill., assignors to Universal Oil Products Company, Chicago, Ill., a corporation of Delaware No Drawing. Application February 6, 1943, Serial No. 475,004

14 Claims. (Cl. 260—683.6)

1

This invention relates to the preparation of hydrocarbons having a shorter carbon chain from a hydrocarbon having a longer carbon chain, the hydrocarbon with longer chain containing at least one carbon atom more than those present in the hydrocarbons produced therefrom. More specifically, the invention is concerned with a process for treating an aliphatic hydrocarbon containing a quaternary carbon atom to effect selective demethylation and produce a saturated hydrocarbon of lower molecular weight containing a quaternary carbon atom.

In one specific embodiment the present invention comprises a process for treating with hydrogen a paraffinic hydrocarbon having a quaternary carbon atom to produce therefrom a hydrocarbon of lower molecular weight also containing a quaternary carbon atom.

Heretofore destructive hydrogenation methods have been utilized in producing gasoline from higher boiling oils in the presence of various hydrogenating catalysts. Such a process may be regarded as a cracking of the higher boiling oils accompanied by hydrogenation of the resultant products of lower molecular weight to form substantially saturated hydrocarbons boiling within the range of gasoline. The present process differs from the destructive hydrogenation methods of the prior art in that it specifically involves demethylation, and also in the nature of the charging stock, the particular and specific conditions of operation necessary to effect the herein described selective demethylation process, and also the products which have highly branched chain structures and high antiknock values.

By the term "selective demethylation" we mean the herein described treatment of an aliphatic hydrocarbon with hydrogen in the presence of a catalyst whereby certain methyl groups are removed in preference to other groups from a hydrocarbon molecule being subjected to said treatment. For example, neohexane, which has the formula (CH$_3$)$_3$—C—CH$_2$—CH$_3$, has four terminal methyl groups, three of which groups are combined with the quaternary carbon atom and the remaining methyl group is a part of the ethyl group of the neohexane molecule. Accordingly if any one of the methyl groups attached to the quaternary carbon atom is removed therefrom under hydrogenating conditions, methane

2 and isopentane will be formed while the similar splitting-off of the other methyl group which is a portion of the ethyl group of the neohexane molecule would result in the formation of methane and neopentane. Accordingly, if all of the bonds between the different carbon atoms of the neohexane molecule are of equal strength, the probability of isopentane formation is three times that of neopentane production. However, we have found experimentally that the bonds between the carbon atoms of the neopentyl group are stronger than is the bond between the neopentyl group and the terminal methyl group of the neohexane molecule. The experimental evidence shows that in this treatment neopentane production is 5.4 times greater than the production of isopentane.

Similar demethylation of 2,2,4-trimethyl pentane results in the removal as methane of methyl groups bound to carbon atoms other than the quaternary carbon atom. Thus, this particular iso-octane undergoes selective demethylation to form substantial amounts of neohexane, also known as 2,2-dimethyl butane; and 2,2-dimethyl pentane, which may be referred to as neoheptane. Such formation of neoheptane and neohexane is accompanied by the production of methane by hydrogenation of the one or two methyl groups so removed from 2,2,4-trimethyl pentane.

We have also found that triptane, more exactly known as 2,2,3-trimethyl butane, is also produced in substantial yield by treating 2,2,3-trimethyl pentane according to the process of our invention. Triptane is also producible by our process from 2,3,3-trimethyl pentane and from certain nonanes and other hydrocarbons containing a triptyl group. Such hydrocarbon starting materials contain adjacent quaternary and tertiary carbon atoms, that is one carbon atom is combined chemically with four other carbon atoms and one of said four carbon atoms is tertiary in that it is bound to the quaternary carbon atom, to two other carbon atoms, and to only one hydrogen atom.

According to our invention, it is possible to selectively remove methane from a hydrocarbon containing a triptyl structure so as to produce a lower molecular weight hydrocarbon containing only a quaternary carbon atom, a tertiary carbon atom, and the other carbon atoms bound directly to said quaternary and tertiary carbon atoms. This process effects the selective removal of methane usually from the longest and least branched alkyl group which is bound to the quaternary or tertiary carbon atoms of the hydrocarbon.

The hydrocarbon which is submitted to demethylation treatment may also contain more than one tertiary carbon atom.

The selective demethylation treatment of aliphatic hydrocarbons containing a quaternary carbon atom may be carried out either continuously or in batch type operation in the presence of a hydrogenating catalyst at a temperature of from about 175° to about 375° C. and under a pressure of from substantially atmospheric to approximately 300 atmospheres. Suitable catalysts comprise the metals of the iron group and their oxides including iron, nickel, and cobalt used as such or supported by carriers; and also the noble metals platinum and palladium. Under some conditions of operation selective demethylation may also be effected in the presence of an oxide or sulfide of a metal of the left-hand column of Group 6 of the Periodic Table including chromium, molybdenum, and tungsten.

A highly active nickel catalyst which we have used in demethylation treatment of paraffins contains approximately 66% by weight of total nickel, 30% of diatomaceous earth, and 4% of oxygen, the latter present with nickel as nickel oxide. This catalyst is made by the general steps of suspending diatomaceous earth, also known as kieselguhr, in a dilute aqueous solution of nickel sulfate and then gradually adding thereto an excess of a hot saturated solution of sodium carbonate. The mixture of nickel sulfate solution and diatomaceous earth is agitated vigorously while the sodium carbonate solution is introduced thereto to form a precipitate which is then removed by filtration, washed, dried, and reduced with hydrogen.

The particular operating conditions of temperature and pressure utilized in the present process are dependent upon the hydrocarbon or hydrocarbon mixture being treated, the composition and activity of the catalyst, the ratio of hydrogen to hydrocarbon, and other factors. Furthermore, the different hydrocarbons which may be subjected to hydrogenation to split methane therefrom and form substantially saturated hydrocarbons of lower molecular weight are not necessarily equivalent in their behavior under conditions of selective demethylation.

It is sometimes advantageous to commingle the hydrogen with methane or some other substantially inert gas in order to control the reaction temperature and the extent of the demethylation reaction. Proper control of the demethylation reaction is desirable and necessary as otherwise the desired products of the process undergo further demethylation to lower molecular weight paraffins. Such control of the demethylation process may be accomplished by regulating the partial pressure of the hydrogen in the system, for example by recycling a portion of the methane or methane-hydrogen mixture coming from the process or by mixing with the hydrogen controlled amounts of some other inert gas. The ratio of hydrogen to methane may be adjusted so as to assist in controlling the temperature of the catalyst upon which considerable heat of reaction is liberated because of the highly exothermic nature of the demethylation reaction.

Batch type treatment of aliphatic hydrocarbons may be carried out in reactors or autoclaves of suitable design in which the hydrocarbon charged and catalyst may be contacted with hydrogen or a hydrogen-containing gas mixture under the desired conditions of operation and for a suitable length of time to effect the splitting out in the form of methane of one or more methyl groups.

The process may be operated continuously in a suitable chamber or tubular reactor containing the catalyst and through which the hydrocarbon charging stock is passed in the presence of hydrogen under desired conditions of temperature and pressure. Thus, the reaction products are continuously discharged from the reactor at substantially the rate at which they are charged thereto. The products of the selective demethylation treatment are fractionated by suitable means to separate the desired lower boiling hydrocarbons from the unconverted portion of the hydrocarbon material charged to the process, and said unconverted portion of hydrocarbon material is recycled to commingle with the hydrocarbon material charged to the process.

The process is not limited to any particular type of apparatus and depends for its successful operation upon the use of particular temperatures along with proper pressures and times of contact suitable to the different demethylation catalysts utilized.

The following examples are given to illustrate the process of the invention, although with no intention of unduly limiting its generally broad scope.

Example I

A catalyst containing approximately 66% by weight of total nickel, 30% of diatomaceous earth, and 4% of oxygen in the form of nickel oxide was prepared by suspending diatomaceous earth in a dilute aqueous solution of nickel sulfate and then gradually adding thereto with vigorous agitation an excess of a hot saturated solution of sodium carbonate to form a precipitate consisting essentially of nickel carbonate mixed with diatomaceous earth. The resultant mixture of precipitate and diatomaceous earth wash filtered from the mother liquor, washed, dried, and reduced with hydrogen to form an active catalyst.

35 parts by weight of neohexane and 8 parts by weight of the above described reduced nickel-diatomaceous earth catalyst were placed in a rotatable steel autoclave, hydrogen was introduced to a pressure of 100 atmospheres and the resultant mixture was heated at a temperature of between 260° and 275° C. for 4.5 hours. After this treatment the autoclave was cooled to room temperature and about 30 parts by weight of liquid products were removed therefrom. Fractional distillation separated these liquid products into 1.5 mole per cent of butane, 9.6% of neopentane, 1.8% of isopentane, 1.4% of normal pentane, 83.7% of unconverted neohexane, and 2% by weight of higher boiling materials. A 59 mole per cent yield of neopentane was thus obtained upon the basis of the neohexane which underwent conversion. There was also about a 20% yield of a mixture of isopentane and normal pentane while butane production was equivalent to about 9% of the neohexane converted.

Example II

Mixtures of neohexane and hydrogen were passed continuously under atmospheric pressure through a cylindrical reactor containing 3 x 3 mm. cylindrical particles of the nickel-kieselguhr catalyst referred to in Example I and maintained at the temperatures shown in the following table which also gives the yields of neopentane and other products obtained.

*Catalytic partial demethylation of neohexane in the presence of hydrogen*

| Run No. | 1 | 2 | 3 | 4 |
|---|---|---|---|---|
| Catalyst reactor temp., °C | 215 | 225 | 226 | 253 |
| Duration of run, minutes | 60 | 45 | 60 | 45 |
| Neohexane charging rate, vol. per hour per vol. of catalyst | 0.57 | 1.2 | 0.57 | 1.2 |
| Molar ratio of hydrogen to neohexane chgd | 2.6 | 2.5 | 2.5 | 2.7 |
| Moles of hydrogen chgd | 0.85 | 0.63 | 0.80 | 0.67 |
| Liquid product, wt. per cent of neohexane chgd | 97.0 | 94 | 42.5 | 40.1 |
| Non-condensible gas, moles | 0.87 | 0.65 | 1.0 | 0.87 |
| Analysis of liquid product, mole per cent: | | | | |
| Butanes | 0.2 | 0.5 | 2.9 | 1.2 |
| Neopentane | 4.5 | 4.3 | 21.1 | 20.8 |
| iso- and n-pentanes | 1.0 | 0.5 | 0.5 | 0.0 |
| Neohexane | 94.0 | 94.7 | 75.5 | 78.0 |
| Analysis of non-condensible gas, mole per cent: | | | | |
| Hydrogen | 96.0 | 94.3 | 2.7 | 2.1 |
| Methane | 4.0 | 5.7 | 96.8 | 97.9 |
| Ultimate yield of neopentane, mole per cent of neohexane charged | 50 | 39 | 31 | 39 |

The results given in the above table show that the selective demethylation reaction requires careful control of operating conditions in order to produce substantial yields of neopentane and to suppress excessive formation of methane. At a reactor temperature of 215° C. and under atmospheric pressure about 50 mole per cent of the neohexane which reacted yielded neopentane. At a higher temperature, as at 225–226° C., the amount of neohexane converted per pass was dependent upon the rate at which this hydrocarbon was charged to the process. When 1.2 volumes of neohexane was charged per hour per volume of catalyst, the recovered liquid product containing about 4.3 mole per cent of neopentane corresponded to an ultimate or recycle yield of 39%. However, when 0.57 volume of neohexane was charged per hour per volume of catalyst in run 3, the recovered liquid product contained 21 mole per cent of neopentane but this yield corresponded to only about 31% of the theoretical based upon the amount of neohexane undergoing conversion. Run 4 which was made at a reactor temperature of 253° C. but otherwise under essentially the same operating conditions as run 2 yielded a liquid product corresponding to 40% by weight of the neohexane charged. This liquid product contained 20.8 mole per cent of neopentane. This result indicates that with recycling of unconverted neohexane, a 39 mole per cent yield of neopentane was obtainable. In these runs in which considerable conversion occurred the temperature at the surface of the catalyst was higher than the reactor temperature because of the heat liberated by the demethylation reaction.

EXAMPLE III 250 cc. of an octane mixture containing about 85% of 2,2,3-trimethyl pentane and about 15% of 2,2,4- and 2,3,4-trimethyl pentanes was subjected to the action of hydrogen at 300° C. for 4 hours in the presence of 20 grams of the catalyst described in Example I. In this run the octane mixture was charged to a rotatable steel autoclave of 850 cc. capacity to which hydrogen was then introduced to 100 atmospheres initial pressure.

After the autoclave and contents had been heated as aforementioned, the autoclave was then permitted to cool and the residual gases were released and analyzed. This residual gas contained 0.2% by volume of oxygen, 0.2% carbon monoxide, 88.1% hydrogen, 8.5% of methane, and 3% of nitrogen.

After the gas was released, 235 cc. of liquid product was recovered from which the catalyst was removed by filtration. Fractional distillation of the filtered liquid product separated therefrom a fraction of 16 cc. of heptanes containing at least 85% by volume of triptane. Intermediate fractions containing approximately 60% of triptane were also obtained which increased the yield of triptane to 8.4% based upon the octane mixture charged to the autoclave. Besides containing triptane, the recovered liquid product consisted essentially of unconverted octane fraction suitable for recycling to further demethylation treatment. The recycle yield of triptane would accordingly amount to approximately 77%. It will be noted that the total of 23 cc. of triptane produced as shown by the analysis of the liquid product corresponded closely to the 25 cc. yield of heptanes calculated from the formation of methane by assuming that the demethylation of one molecular proportion of octane yielded one molecular proportion each of heptane and methane.

Previous freezing point tests on synthetic mixtures containing 85% by volume of triptane and 15% of either 2,2- or 2,4-dimethyl pentanes, which have boiling points close to that of triptane, showed that such mixtures become solid at −78° C. The presence in triptane of larger amounts of these other heptanes results in mixtures which do not become solid at −78° C. The 16 cc. fraction of heptanes obtained in the above mentioned run solidified completely when cooled to −78° C. and therefore is considered to contain at least 85% of triptane. Additional proof that triptane was present in this fraction was obtained by brominating it in the presence of light to give a solid monobromide melting at 152° C. which is the melting point of the monobromide similarly obtained from synthetically prepared triptane. Also when the monobromide prepared from the fraction of a demethylation product was mixed with triptyl bromide, a mixed melting point of 152–153° C. was obtained, thus proving the presence of triptane in the products formed by subjecting 2,2,3-trimethyl pentane to hydrogenation treatment.

EXAMPLE IV

An octane mixture containing approximately 70% of 2,2,3-trimethyl pentane and 30% of 2,3,4-trimethyl pentane was used as charging stock in another run carried out in the same autoclave referred to in Example III. In this run 250 cc. of the octane mixture and 40 grams of the catalyst described in Example I were placed in the autoclave and hydrogen was introduced thereto to an initial pressure of 100 atmospheres. The autoclave so charged was then rotated and heated at 300° C. for 6 hours under a maximum pressure of 200 atmospheres. The autoclave and contents were then cooled to room temperature, the residual gas consisting essentially of hydrogen and methane was released, and a mixture of 240 cc. of liquid hydrocarbons and catalyst was removed from the autoclave. Fractional distillation of the recovered liquid hydrocarbons gave the following yields of products based upon the octane mixture charged to the autoclave:

|                          | Per cent by volume |
|--------------------------|-------------------:|
| Hexanes                  | 4.7                |
| Triptane                 | 19.9               |
| 2,3-dimethyl pentane     | 8.2                |
| 2,2,4-trimethyl pentane  | 3.5                |
| Unconverted octanes      | 59.7               |
| Volume loss              | 4                  |

Upon the basis of the amount of 2,2,3-trimethyl pentane present in the charging stock, the triptane yield of 19.9% corresponded to 77% of the 2,2,3-trimethyl pentane converted. Recycling of the octane mixture recovered from the reaction products should accordingly give an ultimate yield of about 77% of triptane.

Fractional distillation of the heptane fraction comprising essentially a mixture of triptane and 2,3-dimethyl pentane obtained in this run gave a 40 cc. fraction, which upon the basis of its melting point, was estimated to contain about 97% by volume of triptane.

The foregoing specification and examples indicate the character and value of the present process, although it is not intended that either section should unduly limit the generally broad scope of the invention.

We claim as our invention:

1. A process for demethylating 2,2,3 trimethylpentane which comprises commingling the 2,2,3 trimethylpentane with hydrogen in the amount of at least about 1.6 mols of hydrogen per mol of 2,2,3 trimethylpentane subjecting the resultant mixture to reaction at a temperature of from about 175° to about 375° C. and a pressure of from atmospheric to about 300 atmospheres in the presence of a hydrogenating catalyst and correlating the mol ratio of hydrogen to 2,2,3 trimethylpentane and the temperature and pressure to remove the end methyl radical not attached to either the quaternary or tertiary carbon atoms of said 2,2,3 trimethylpentane whereby to form triptane as the principal reaction of the process.

2. A process for producing a lower molecular weight saturated hydrocarbon from a paraffin containing a quaternary carbon atom having attached thereto an alkyl radical of at least two carbon atoms, which comprises commingling said paraffin with hydrogen in the amount of at least about 1.6 mols of hydrogen per mol of the paraffin, subjecting the resultant mixture to reaction in the presence of a hydrogenating catalyst at a temperature of from about 175° C. to about 375° C. and under a pressure of from atmospheric to about 300 atmospheres to replace with hydrogen the terminal methyl group of said alkyl radical of the paraffin molecule, terminating the reaction of hydrogen with said paraffin prior to the splitting from the paraffin molecule of an alkyl group of more than one carbon atom and prior to scission of any of the bonds of said quaternary carbon atom, whereby to lower the number of carbon atoms of the paraffin molecule solely by demethylation while retaining its quaternary carbon atom configuration, and recovering as the principal product of the process the resultant demethylated paraffin having the quaternary carbon atom configuration.

3. The process of claim 2 further characterized in that said hydrogenating catalyst comprises a metal of the iron group of the periodic table of the elements.

4. A process for producing a lower molecular weight saturated hydrocarbon from a paraffin containing a quaternary carbon atom having attached thereto three methyl radicals and an alkyl radical of at least two carbon atoms, which comprises commingling said paraffin with hydrogen in the amount of at least about 1.6 mols of hydrogen per mol of the paraffin, subjecting the resultant mixture to reaction in the presence of a hydrogenating catalyst at a temperature of from about 175° C. to about 375° C. and under a pressure of from atmospheric to about 300 atmospheres with hydrogen the terminal methyl group of said alkyl radical of the paraffin molecule, terminating the reaction of hydrogen with said paraffin prior to the splitting from the paraffin molecule of an alkyl group of more than one carbon atom and of any of the methyl radicals attached to said quaternary carbon atom, whereby to lower the number of carbon atoms of the paraffin molecule solely by demethylation of said alkyl radical while retaining the quaternary carbon atom configuration of the paraffin molecule, and recovering as the principal product of the process the resultant demethylated paraffin having the quaternary carbon atom configuration.

5. A process for producing neopentane from a paraffin containing a quaternary carbon atom having attached thereto three methyl radicals and an ethyl radical, which comprises commingling said paraffin with hydrogen in the amount of at least about 1.6 mols of hydrogen per mol of the paraffin, subjecting the resultant mixture to reaction in the presence of a hydrogenating catalyst at a temperature of from about 175° C. to about 375° C. and under a pressure of from atmospheric to about 300 atmospheres to replace with hydrogen only the terminal methyl group of said ethyl radical of the paraffin molecule, terminating the reaction of hydrogen with said paraffin prior to scission of any of the bonds of said quaternary carbon atom, whereby to lower the number of carbon atoms of the paraffin molecule solely by removal of said terminal methyl group while retaining the quaternary carbon atom configuration of the paraffin molecule, and recovering as the principal product of the process the resultant demethylated paraffin containing the quaternary carbon atom having four methyl groups attached thereto.

6. A process for producing triptane which comprises commingling 2,2,3-trimethylpentane with hydrogen in the amount of at least about 1.6 mols of hydrogen per mol of said hydrocarbon, subjecting the resultant mixture to reaction in the presence of a hydrogenating catalyst at a temperature of from about 175° C. to about 375° C. and under a pressure of from atmospheric to about 300 atmospheres to replace with hydrogen the terminal methyl group not attached to the quaternary or tertiary carbon atom of the hydrocarbon molecule, terminating the reaction of hydrogen with said hydrocarbon prior to the splitting from the latter of any alkyl group other than said terminal methyl group, whereby to lower by one the number of carbon atoms of the hydrocarbon molecule while retaining the adjacent quaternary and tertiary carbon atom configuration of the hydrocarbon molecule, and recovering as the principal product of the process the resultant demethylated paraffin having adjacent quaternary and tertiary carbon atoms.

7. The process as defined in claim 2 further characterized in that said catalyst comprises nickel.

8. The process as defined in claim 5 further characterized in that said catalyst comprises nickel.

9. The process as defined in claim 6 further characterized in that said catalyst comprises nickel.

10. A process for producing a lower molecular weight saturated hydrocarbon from a paraffin containing a quaternary carbon atom having attached thereto an alkyl radical of at least two carbon atoms, which comprises commingling said paraffin with hydrogen in the amount of at least about 1.6 mols of hydrogen per mol of the paraffin, subjecting the resultant mixture to reaction in the presence of a hydrogenating catalyst at a temperature of from about 175° C. to about 375° C. and under a pressure of from atmospheric to about 300 atmospheres to replace with hydrogen the terminal methyl group of said alkyl radical of the paraffin molecule, correlating said temperature and pressure to prevent the splitting from the paraffin molecule of an alkyl group of more than one carbon atom and the scission of any of the bonds of said quaternary carbon atom, whereby to lower the number of carbon atoms of the paraffin molecule solely by demethylation while retaining its quaternary carbon atom configuration, and recovering as the principal product of the process the resultant demethylated paraffin having the quaternary carbon atom configuration.

11. The process as defined in claim 10 further characterized in that said paraffin is a trimethylpentane.

12. The process as defined in claim 10 further characterized in that said paraffin is 2,2,3-trimethylpentane.

13. The process as defined in claim 10 further characterized in that said paraffin is neohexane.

14. A process for producing a lower molecular weight saturated hydrocarbon from a paraffin containing a quaternary carbon atom having attached thereto an alkyl radical of at least two carbon atoms, which comprises commingling said paraffin with hydrogen in the amount of at least about 1.6 mols of hydrogen per mol of the paraffin, subjecting the resultant mixture to reaction in the presence of a hydrogenating catalyst at a temperature of from about 205° C. to about 350° C. and under a pressure of from 15 to about 3000 pounds per square inch to replace with hydrogen the terminal methyl group of said alkyl radical of the paraffin molecule, terminating the reaction of hydrogen with said paraffin prior to the splitting from the paraffin molecule of an alkyl group of more than one carbon atom and prior to scission of any of the bonds of said quaternary carbon atom, whereby to lower the number of carbon atoms of the paraffin molecule solely by demethylation while retaining its quaternary carbon configuration, and recovering as the principal product of the process the resultant demethylated paraffin having the quaternary carbon atom configuration.

VLADIMIR HAENSEL.
VLADIMIR N. IPATIEFF.

REFERENCES CITED

The following references are of record in the file of this patent:

UNITED STATES PATENTS

| Number | Name | Date |
| --- | --- | --- |
| 2,214,463 | Ipatieff et al. | Sept. 10, 1940 |
| 2,259,862 | Ruys et al. | Oct. 21, 1941 |
| 2,322,863 | Marschner | June 29, 1943 |
| 1,960,206 | Edmonds | May 22, 1934 |
| 2,270,303 | Ipatieff | Jan. 20, 1942 |

OTHER REFERENCES

Otuka et al., "Journal of the Society of Chemical Industry, Japan," vol. 43, No. 12, pages 454B to 456B, December, 1940. (Copy in Division 31 at 196–53.)